April 3, 1962 R. A. HAACK 3,027,580
RAMP FOR LOADING VEHICLES ON FREIGHT CARS
Filed Nov. 25, 1960 2 Sheets-Sheet 1
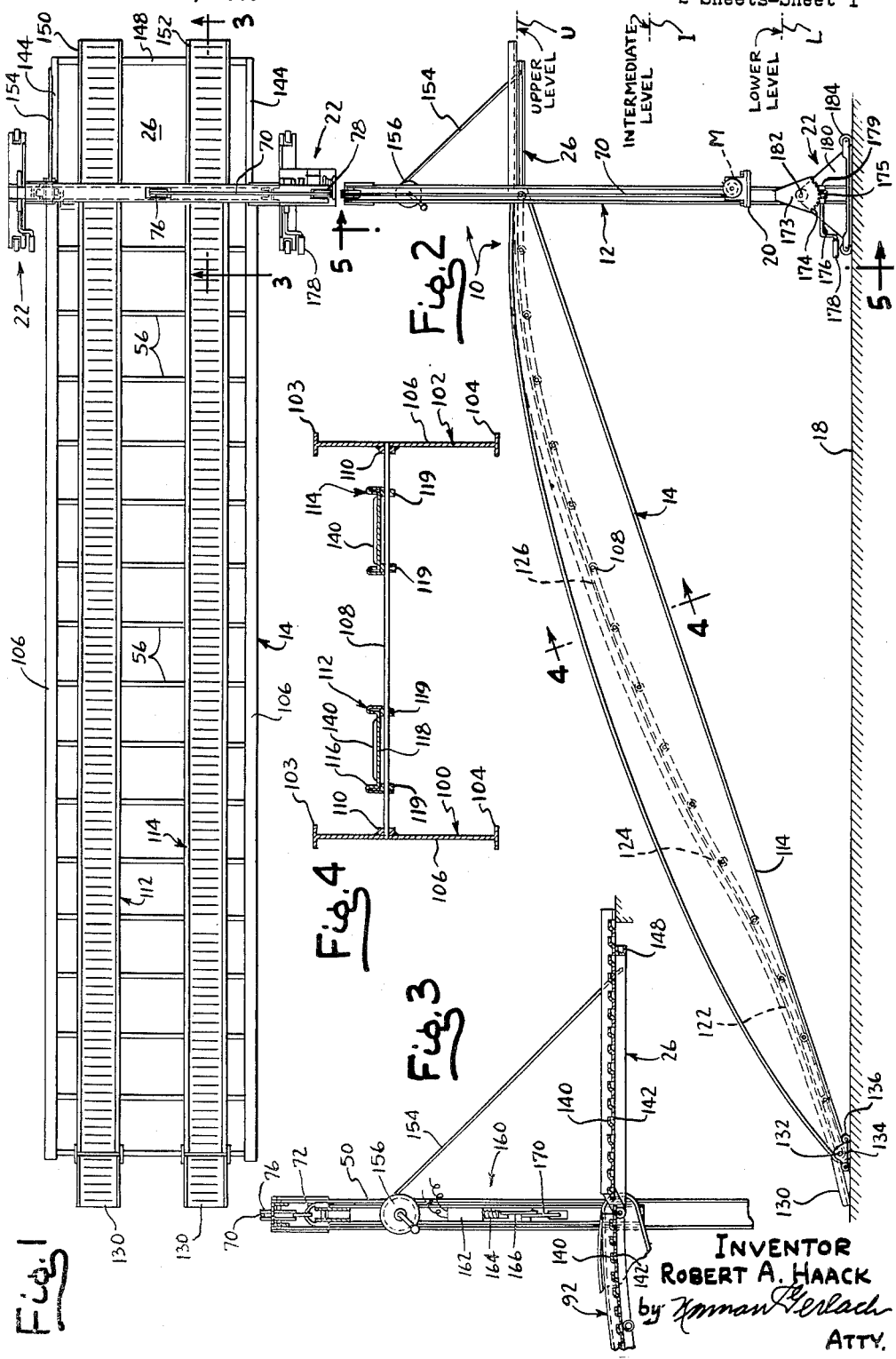
INVENTOR
ROBERT A. HAACK
by Norman Gerlach
ATTY.

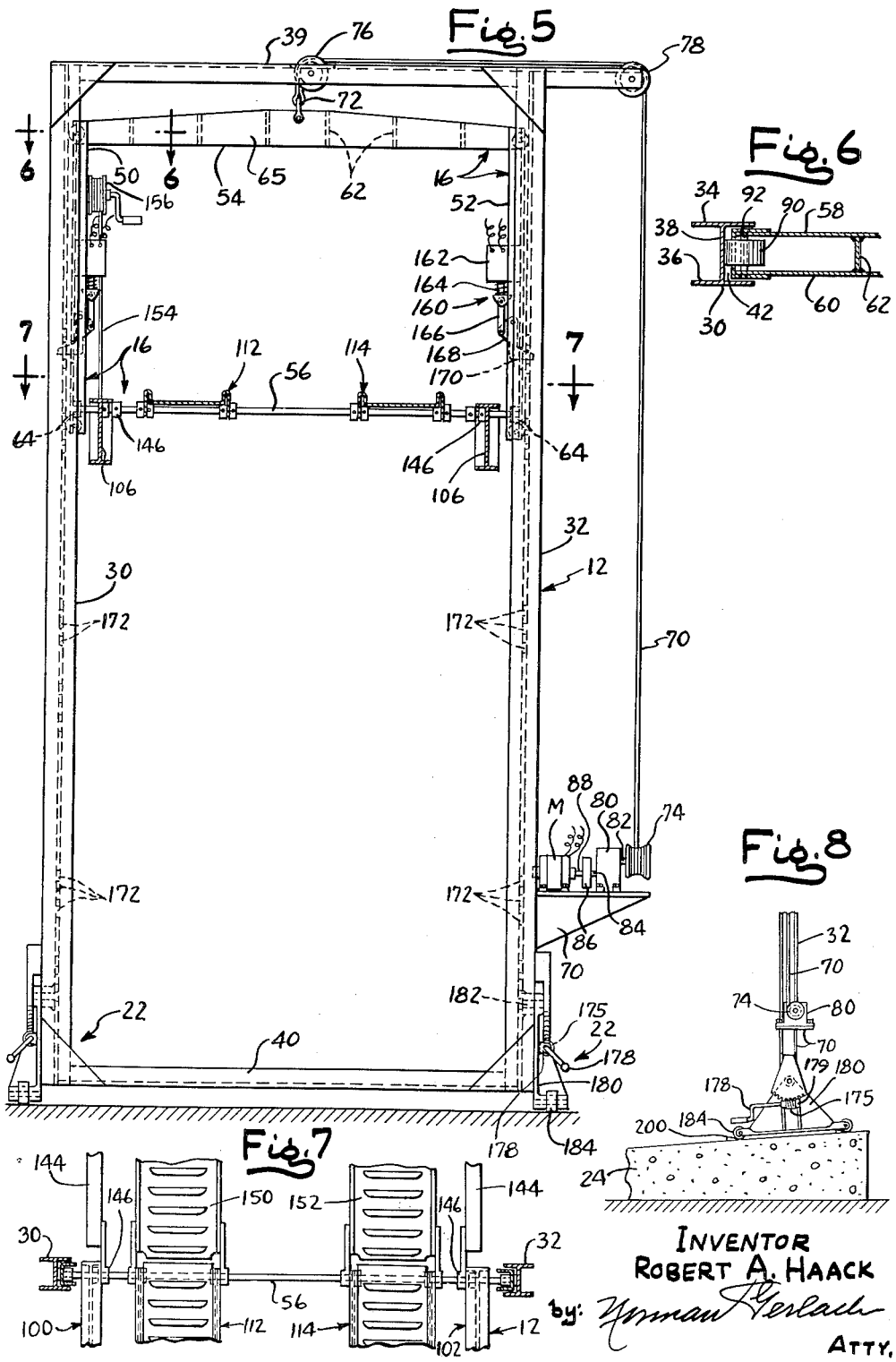

United States Patent Office 3,027,580
Patented Apr. 3, 1962

3,027,580
RAMP FOR LOADING VEHICLES ON
FREIGHT CARS
Robert A. Haack, 2902 Thayer St., Evanston, Ill.
Filed Nov. 25, 1960, Ser. No. 71,480
1 Claim. (Cl. 14—72)

The present invention relates to apparatus for loading and unloading automotive vehicles such as automobiles, trucks, and the like on railway cars, particularly railway cars of the multi-deck variety wherein the vehicle-supporting decks and, consequently, the vehicles supported thereon, are disposed in superimposed relationship. The invention has been illustrated and described herein in connection with the loading and unloading of multi-deck railway freight cars having three superimposed vehicle levels including the usual car platform level, an intermediate level immediately above the platform level, and an upper level above the intermediate level. The invention, is, however, capable of other uses and the same may, if desired, with or without suitable modification, be employed in connection with the loading and unloading of automotive vehicles on railway cars having a greater or lesser number of vehicle-supporting levels, or in connection with the loading of vehicles on the superimposed freight decks of a navigable vessel, of a vehicle storage or parking building, or upon the various racks, platforms, or other levels of a stationary or movable vehicle storage or parking rack structure. Irrespective, however, of the particular use to which the present invention may be put, the essential features thereof are at all times preserved.

Heretofore, in connection with the loading and unloading of three-deck or level railway freight cars, particularly at terminal-loading and unloading stations or depots, the vehicles are driven onto the various levels of the freight car, utilizing individual ramps, one for each of the levels involved. Usually, the ramp leading to the lowermost level, i.e., the railway car platform, is a fixed permanent ramp structure which frequently is formed of concrete. This permanent ramp structure is aligned with the terminal end of the railway car track so that the car may be backed into position in close proximity to the ramp with the car platform assuming substantially the level of the upper end of the ramp. When a bridge plate is placed between the ramp and car platform, the vehicles may be driven under their own power up the ramp and onto the car platform without difficulty. In order to load the intermediate and upper levels of the railway car, individual portable ramps are provided. Such portable ramps are self-contained units embodying framework which is supported on the floor of the depot by means of traction wheels so that the ramps may be wheeled into and out of position above the permanent concrete ramp. The framework of such ramp structures must necessarily be designed so as to afford a clearance for the fixed permanent concrete ramp and, in manipulating these ramps into and out of position, they can only be brought into operative loading position head-on, so to speak, since before they can be brought into juxtaposition with the various freight car levels, they must be aligned with the permanent concrete ramp and, thereafter, moved forwardly over such ramp to bring their upper ends into operative register with the loading levels of the freight car. It is also necessary during any given loading operation to remove one ramp before the other ramp can be brought into operating position without interference. The necessity of providing individual ramps for the various loading levels of the freight car presents a problem in storage space, since while one ramp is being used, the other ramps consume considerable space in the vicinity of the loading operations.

Another limitation that is attendant upon the use of such conventional loading and unloading apparatus resides in the number of handlers required to effect the setting-up and the changeover operations, at least two workmen being required to effect ramp placement, substitution or the like.

The present invention is designed to overcome the above-noted limitations that are attendant upon the construction and use of such conventional apparatus for loading and unloading automotive vehicles on multi-deck freight cars and, toward this end, the invention contemplates the provision of a novel freight car-loading apparatus capable of placement in operative register with the loading end of a multi-deck railway freight car, and having associated therewith a single adjustable ramp proper, the forward or upper end of which is capable of selective register with all of the three levels associated with the freight car, together with electrically-powered means whereby such upper end of the ramp may be selectively bought into such operative register with the various levels without requiring any manual effort whatsoever on the part of a handler or other workman. The provision of a vehicle-loading and unloading apparatus of this character constitutes the principal object of the present invention and, in carrying out this object, there is provided an open, generally rectangular frame-like structure of a height somewhat greater than the height of the uppermost level to be accommodated. Within the frame-like structure, there is disposed a vertically movable carriage to which there is pivoted the forward end of a ramp proper. The rear end of the ramp is capable of tractional sliding movement on the depot floor or other supporting surface. An electric motor is provided and is operatively connected to the carriage to effect vertical movement of the latter so that as the carriage is raised or lowered, the forward end of the ramp moves therewith. By controlling the elevation of the carriage, the forward end of the ramp may thus be selectively brought into horizotnal register with the various levels for loading purposes.

It is another and important object of the invention to provide an apparatus of the character briefly outlined above which is so designed that it is capable of use without modification in connection with loading depots which are provided with permanent concrete or other lower-level loading ramps, or which have no such permanent ramps, the present apparatus being readily movable in and out ol position without interference in either instance.

A similar and related object of the invention is to provide an apparatus of this sort wherein the carriage-supporting frame is capable of slight angular adjustment or tilting movement so that when the apparatus is used at a depot where no permanent concrete or other lower-level ramp is provided, the carriage-supporting frame may be supported on the depot floor or other supporting surface in such a manner that it will extend vertically and span the vertical distances between the various levels in close proximity to the loading ends of thereof, and so that when the apparatus is used in connection with a loading depot having a permanent concrete or other lower-level ramp, the carriage-supporting frame may itself be supported directly on the upper regions of the permanent ramp and the frame so adjusted as to compensate for the inclination of the permanent ramp at its point of support to maintain the frame in vertical position for proper selective proximate register of the forward end of the adjustable ramp with the various loading levels. In carrying out this last-mentioned object of the invention, the invention contemplates the provision of a novel form of tiltable foot structure for the carriage-supporting frame, together with means whereby the same is self-locking in any selected position of angular adjustment.

Yet another object of the invention, in an apparatus of this general character, is to provide a ramp structure which is so designed that, regardless of the particular level undergoing loading at any given time, it affords an ample amount of clearance for the crankcase or undercarriage of the vehicle as the same passes over the rear end of the platform, rack, or other vehicle support at the level undergoing loading, and which also is so designed as to provide the necessary clearance between the ramp structure itself and all portions of the vehicle body or chassis which is ascending or descending upon the ramp structure.

Yet another object of the invention is to provide such a ramp structure having associated therewith a novel and effective tractional friction means for preventing slipping of the vehicle wheels upon the ramp traction surface, such friction means being economically provided by a stamping operation wherein a series of spaced tongues are struck upwardly from the traction surface and the voids from which the tongues are offset serving as a drainage medium for preventing the collection of snow, ice or moisture upon the traction surface during inclement weather.

Another and important object of the invention is to provide a railway car-loading apparatus such as has briefly been outlined above, and which has associated therewith a novel ramp structure including spaced parallel wheel-guiding tracks or channels which afford respective traction surfaces for the right and left traction wheels of the vehicle, such traction channels being relatively adjustable toward and away from each other to accommodate vehicles having different wheel spreads.

Another object of the invention is to provide a railway freight car-loading apparatus having an adjustable ramp as set forth above and in which the upper end of the ramp has associated therewith a permanently affixed and pivoted bridge assembly which is manually movable between an extended operative position wherein it bridges the distance between the upper end of the ramp proper at any given level and the rear end of the supporting surface provided at such level, and a retracted out-of-the-way position.

The provision of a vehicle-loading apparatus for multideck railway freight cars which is extremely simple in its construction and which may be manufactured, in the main, from conventional structural steel parts such as channels, I-beams and the like, thereby contributing toward economy in manufacture; one which is comprised of a minimum number of parts, particularly moving parts, and which, therefore, is unlikely to get out of order; one which is rugged and durable and which will, therefore, withstand rough usage; one which is capable of ease of assembly and disassembly for purposes of inspection of parts, replacement or repair thereof; one which may readily be manipulated by a single operator; and one which otherwise is well-adapted to perform the services required of it, are further desirable features which have been borne in mind in the production and development of the present invention.

Numerous other objects and advantages of the invention, not at this time enumerated, will become more readily apparent as the nature of the invention is better understood.

In the accompanying two sheets of drawings forming a part of this specification, one illustrative embodiment of the invention has been shown.

In these drawings:

FIG. 1 is a top plan view of a vehicle-loading apparatus constructed in accordance with the principles of the present invention;

FIG. 2 is a side elevational view of the structure shown in FIG. 1;

FIG. 3 is an enlarged sectional view taken substantially along the line 3—3 of FIG. 1;

FIG. 4 is an enlarged sectional view taken substantially along the line 4—4 of FIG. 2;

FIG. 5 is a sectional view taken substantially along the line 5—5 of FIG. 2;

FIG. 6 is a sectional view taken substantially along the line 6—6 of FIG. 5;

FIG. 7 is a sectional view taken substantially along the line 7—7 of FIG. 5; and FIG. 8 is a fragmentary side elevational view of a portion of the structure shown in FIG. 2 illustrating schematically the manner in which the present apparatus is applied at the loading station of a depot having a permanent concrete ramp associated therewith.

Referring now to the drawings in detail, and in particular to FIGS. 1 and 2, a vehicle-loading apparatus constructed in accordance with the principles of the present invention has been designated in its entirety at 10. The apparatus is designed for loading and unloading automotive vehicles, such as automobiles, trucks, and the like, selectively at the various levels of a conventional multi-deck railway freight car. The actual multi-deck railway car has not been illustrated herein, but the various levels upon which the vehicles are to be loaded have been schematically shown in FIG. 2 and designated at L, I and U, respectively. These levels have also been appropriately labelled in this view. The lower level L is usually spaced a slight distance above the regular platform of flooring of the railway car, while the intermediate level I and the upper level U are spaced above the lower level L and are spaced from each other by means of a suitable superstructure mounted on the freight car and these various levels are provided with suitable tracks, the tread portions of which assume the elevations indicated by the broken lines I and U, respectively. For purposes of discussion herein, and in the interests of clarity, the vehicle-loading apparatus 10 will be described with reference to the three levels L, I and U at which the vehicles are discharged in supported relationship onto the freight car, it being understood that a series of the vehicles may be driven forwardly from the vehicle-loading apparatus 10 at the various levels so as to provide a row of such vehicles at each level extending in a fore-and-aft direction relative to the freight car.

Still referring to FIGS. 1 and 2, briefly, the apparatus 10 involves in its general organization, two principal parts or assemblies, namely, a forward carriage-supporting frame assembly 12 and a trailing rear ramp assembly 14. An open frame-like carriage assembly (hereinafter referred to simply as the carriage) is designated in its entirety at 16, and it is adapted to travel vertically within the confines of the frame 12, as best seen in FIG. 5. The forward end of the ramp assembly 14 (which hereinafter will be referred to simply as the ramp) is pivotally connected to the lower regions of the carriage 16, while the rear end of the ramp 14 rests upon and is tractionally slidable upon the supporting surface 18, which, in the illustrated environment of the apparatus 10, may constitute the floor of the loading depot in the vicinity of the actual loading station. The carriage 16 is vertically movable in opposite directions under the control of a reversible electric motor M in a manner that will become clear presently, the motor being operatively mounted on a fixed platform 20 supported on the frame 12. A stable degree of equilibrium is imparted to the vertically-disposed frame 12 by means of a pair of adjustable foot assemblies, each of which has been designated in its entirety at 22 and the details of which will be made clear presently. The foot assemblies 22 permit slight angular tilting movement of the frame 12 when the former are disposed on a supporting surface which is not horizontal, as, for example, on the upper inclined end of the fixed concrete ramp which may be associated with certain loading depots, the ramp 24 of FIG. 8 being an example. The foot assemblies 22 and the manner in which they are manually operable will be set forth in detail presently.

From the above description, it will be seen that the carriage 16 may be brought to any desired elevation along the frame 12 so that the forward end of the ramp 14 may assume a position of substantial horizontal register with any of the three selected levels L, I, or U, for selective loading of these levels by the simple expedient of driving the vehicles upwardly or downwardly along the ramp under their own power and onto or from the selected levels. The forward end of the ramp 14 has associated therewith a retractable bridge assembly, designated in its entirety at 26, to facilitate passage of the vehicle wheels from the forward end of the ramp onto the selected level. The nature of the retractable and extensible bridge assembly 26 will likewise be made clear presently.

The carriage supporting frame 12 is in the form of an open rectangular structure, including vertical side members 30 and 32, respectively, which are preferably in the form of conventional H-beams (see also FIG. 6), including spaced parallel flanges 34 and 36, the medial regions of which are connected together by an interconnecting web 38. The frame 12 further includes top and bottom horizontal members 39 and 40, respectively, which may be in the form of conventional structural channel bars. The ends of the channel bars 39 and 40 may suitably be secured, as, for example, by welding to the upper and lower ends, respectively, of the frame side members 30 and 32. The spaced flanges 34 and 36 of each frame side member, together with the interconnecting web portion 38, in combination, define an inwardly-facing channel void 42. The two channel voids 42 on opposite sides of the frame 12 constitute, in effect, a pair of spaced opposed vertical guideways within which there is slidable the marginal regions of the previously mentioned vertically movable carriage 16.

This carriage 16 is generally in the form of an open rectangular frame-like structure having spaced parallel vertical side members 50 and 52, respectively, each in the form of a channel piece, the channel of which is directed inwardly, and top and bottom horizontal members 54 and 56, respectively. The top horizontal member 54, as best seen in FIGS. 5 and 6, is comprised of a pair of spaced elongated plates 58 and 60 which are maintained in their spaced relationship by means of a series of longitudinally spaced web plates 62. The ends of the members 54 and 56 may be suitably secured to the upper ends of the vertical members 50 and 52, as, for example, by welding. The bottom horizontal member 56 is in the form of a rock shaft 80, the opposite ends of which are confined in bearing cups 64 carried at the lower ends of the vertical members 50 and 52. The rock shaft 56 is preferably, but not necessarily, rotatable within the bearing cups 64.

Vertical movement of the carriage 16 is adapted to be effected under the control of the previously mentioned electric motor M through the medium of a hoisting cable 70, one end of which is attached to a lifting bail 72 provided centrally on the upper member 54 and the other end of which is wound on a suitable winch 74. The intermediate regions of the cable pass over a pair of idler pulleys 76 and 78 in the upper regions of the frame 12, as best seen in FIG. 5. The motor M is operatively connected to the winch 74 in driving relationship through a conventional gear reduction device 80, the output shaft 82 of which supports the winch. The input shaft 84 of the gear reduction device 80 is operatively connected through a conventional solenoid brake mechanism 86 to the motor drive shaft 88. The carriage 16 is guided in its vertical movements along the frame 12 by the sides of the channel voids 42 and a plurality of anti-friction rollers 90 (FIG. 6) mounted on shafts 92, the ends of which are rotatably journalled in the flanges 34 and 36 of the side members 30 and 32, respectively, and serve to center the carriage 16 relative to the frame side members 30 and 32.

Referring now to FIGS. 1 to 4, inclusive, the ramp assembly 14 involves in its general organization a pair of side members 100 and 102, respectively, which are in the form of I-beams having upper and lower flanges 103 and 104 and an interconnecting web 106. As best seen in FIG. 2, the I-beams are gradually tapered in height so that they are wider in the medial regions than at their ends. The two I-beams are fixedly secured together in spaced relationship by means of a series of transversely extending track-supporting bars 108. The opposite ends of the various bars 108 are secured in bosses 110 welded to the webs 106. The various crossbars 108 serve to support thereon a pair of spaced track members 112 and 114, respectively, which may be formed from flat heavy gauge sheet metal stock appropriately folded to provide the generally H-shape cross sectional configuration illustrated in FIG. 4. The two track members 112 and 114 (which hereinafter will be referred to simply as the tracks) include composite side flanges 116 and an intervening web portion 118 which constitutes a traction tread for the vehicle wheels. The transverse bars 108 project through the lower regions of the flanges 116 of both members 112 and 114. The two tracks 112 and 114 are individually slidably disposed on the bar 108 for adjustment therealong toward and away from each other. Set screws such as those illustrated at 119 are provided in connection with certain of the rods 108 for securing the tracks 112 and 114 in selected positions of adjustment and spacing relation to each other.

As best seen in FIG. 2, the contour of the tracks 112 and 114 is such that adjacent to the rear lower regions 122 of the ramp section of each track, the track extends substantially parallel to the straight bottom flange 114 and then curves upwardly as at 124 to increase the track incline. In approximately the upper or forward half of each track the same is bowed upwardly as at 126 on a long radius so that when the upper end of the tracks are in register with the upper level U, the gradually curved end region of the track is substantially tangential to the horizontal plane of this upper level. Thus, as a vehicle proceeds upwardly along the ramp 14, ample clearance will be provided for the crankcase and other portions of the vehicle undercarriage so that these portions of the vehicle will not encounter the approach to the upper level. When the forward upper ends of the tracks are in register with the intermediate level I or the lower level L, an even greater clearance will be afforded. The various transverse bars 108 are, of course, affixed to the webs 106 of the tapered I-beams 100 and 102 at appropriate points to maintain the desired track curvature.

The extreme rear lower end of the ramp 114 may have associated therewith a pivoted end flap 130 in the form of a metal plate, the forward transverse edge of which is provided with a thickened rib 132 through which the rearmost crossbar 108 passes and by means of which the plate is pivoted for swinging movement about a horizontal axis. The rear edge of the plate 130 is adapted to rest upon the supporting surface 18 so that the plate bridges the initial approach to the ramp 14. A pair of pivoted trucks 134 carrying wheels 136 thereon facilitate tractional sliding movement of the rear end of the ramp 14 along the supporting surface 18 as the forward end of the ramp is raised or lowered.

In order to enhance the frictional characteristics of the two tracks 112 and 114, the tread or web portion 118 thereof may be provided with a series of closely spaced upstruck tongues 140 (FIGS. 3 and 4), the upper ends of which are turned laterally into substantial alignment. The voids 142 from which the tongues emerge during the stamping or pressing operation constitute drainage holes for the passage of snow, ice, or any other form of moisture which may tend to collect on the tracks during inclement weather.

The previously mentioned bridge assembly 26 is best illustrated in FIGS. 1 and 3 and it is in the form of a pivoted ramp extension having a parallel side member 144, the proximate ends of which are pivoted as at 146

(see also FIG. 7) to the lower member 56 of the carriage 16. An outer transverse member 148 connects the distal ends of the side members 144 and serves to support thereon the outer regions of a pair of track extensions 150 and 152, respectively, the extension 150, when in its extended position, being in longitudinal register with the track 112, and the extension 152 being similarly associated with the track 114. The bridge assembly 26 is movable between a substantially vertical retracted inoperative position wherein it lies substantially within the confines of the carriage 16 and an extended substantially horizontal position wherein it is projected forwardly as shown in FIG. 2 so that the distal end thereof may rest upon any one of the selected levels L, I or U. To effect movement of the bridge assembly 26, the outer end thereof is operatively connected by means of a cable 154 to a manually operable winch 156 suitably supported on the carriage side member 50 (FIG. 3).

In order to maintain the carriage 16 at selected elevations vertically along the frame 12, a solenoid-actuated latch mechanism designated in its entirety at 160 (FIG. 5) is provided on each vertical frame member 50 and 52 of the carriage. Each latch assembly 160 includes a solenoid proper 162, having a movable core 164 which is operably connected through a link 166 to a latch element 168 having a latch finger 170 designed for cooperation with a series of holes such as the holes shown at 172 provided in the web portions 38 of the frame side members 30 and 32. The various holes 172 are so disposed along the vertical side members 30 and 32 that when they are encountered by the latch fingers 170, the upper end of the ramp 14 will be maintained in substantial horizontal register with the various car-loading levels when the foot members 22 are supported on the supporting surface 18. Any slight discrepancy in the elevation of the holes 172 may be compensated for by the adjustability of the bridge assemblies 26.

The adjustable foot assemblies 22 are provided for the purpose of adjusting the inclination of the vertical frame 12 throughout a slight angle in either direction. Ordinarily, when the foot assemblies 22 rest upon a horizontal supporting surface, such as the supporting surface 18, the assemblies 22 will be adjusted so that the general plane of the frame 12 extends substantially vertically. However, in instances where it is necessary to support the frame 12 on the upper inclined end of a permanent concrete or other ramp such as the ramp shown in FIG. 8, such a ramp being sometimes permanently associated with a given loading depot, the plane of the frame 12 may be brought to a vertical position as shown in this view. Accordingly, a toothed rack 173 (FIG. 2) having an arcuate tooth segment 174 thereon is suitably secured as by welding to the lower end region of each frame side member 30 and 32, and the arcuate segment 174 is designed for cooperation with a worm 175 provided on a worm shaft 176 having an eccentric crank handle 178 associated therewith. The worm shaft 176 is rotatably journalled in suitable brackets 179 affixed to a foot member proper 180 which is pivoted as at 182 to the adjacent frame side member 30 or 32, as the case may be, at a point substantially concentric with the arcuate tooth segment 174. It will be seen, therefore, that upon turning of the eccentric crank 178 in one direction or the other, the angularity of the foot member 180, relative to the vertical plane of the frame 14, may be varied within the limits of the arcuate extent tooth segment 174. The foot member carries a pair of spaced rollers 184 designed for tractional engagement with the supporting surface 18. The over-all width of the vehicle-loading apparatus 10 is such that, when it is moved into operative position at the loading station of a given freight depot having a ramp such as the ramp 24 of FIG. 8, the two foot members proper 180 may rest upon the ramp 24 just inside the side edges of the latter, while the tiltable trucks 134 may rest either upon the lower end of the ramp or upon the supporting surface 18, depending, of course, upon the over-all length of the ramp structure 14. Suitable chocks, such as have been shown at 200, may be applied to the rollers 184 to prevent rearward shifting movement of the entire assembly 10. With the foot assemblies 22 assuming the inclination of the upper face of the ramp 24, the crank handle 178 may be adjusted to bring the general plane of the frame 12 to a vertical position. By proper control of the electric motor M, the carriage 16 may be brought to a lowered position wherein the forward end of the ramp 14 is in substantial horizontal register with the lowermost level L, whereupon the wheel-supporting tracks 112 and 114 will closely overlie the upper face of the ramp 24. For loading the intermediate level, the carriage 16 will be brought to such a position that the forward upper end of the ramp 14 registers with such intermediate level, at which time the solenoid actuated-latch fingers 170 will move into operative register with respective holes 172 provided in the members 30 and 32 to maintain or lock the carriage in this position of elevation. Thereafter, the bridge assembly 26 may be lowered into position in the manner previously described so that its distal edge region rests upon the supporting surface of the intermediate level. It is obvious that when loading the uppermost level U, the carriage 16 will still be further elevated to bring the forward end of the ramp 14 into registry with such level.

It is believed that from the above description, the construction, operation, and numerous advantages of the present invention will be clearly apparent without further description. It is to be noted, however, at this point that, due to the relatively high gear ratio effected by the gear reduction device 80 (FIG. 5), the carriage 16 is self-locking in any selected position of elevation so that the weight thereof, together with the weight of any vehicles which may be positioned on the ramp 14, will not operate to effect a backward drive through the gear reduction device in the event of failure of the source of current supply which operates the motor M, the solenoid latch devices 160, and the solenoid-operated brake 86. Lowering of the carriage 16 may only be obtained by positive operation of the motor M in a reverse direction. The solenoid devices 160 may be spring-loaded so that the latch pins will automatically move into register and cooperation with the latch holes 172 and, similarly, the solenoid brake 86 may be of the normally energized type so that the brake is normally effective. In order to release the brake, it is necessary to energize the electric circuit for the solenoid associated with the same.

The invention is not to be limited to the exact arrangement of parts shown in the accompanying drawings or described in this specification as various changes in the details of construction may be resorted to without departing from the spirit of the invention. Therefore, only insofar as the invention has particularly been pointed out in the accompanying claim is the same to be limited. As heretofore indicated, the apparatus is designed for use in unloading as well as loading automotive vehicles with respect to a multi-deck railway car, and it is, therefore, to be understood that in the claim the word "loading" is used in a broad or generic sense so as to include "unloading" as well.

Having thus described the invention what I claim as new and desire to secure by Letters Patent is:

In an apparatus for loading automobile vehicles upon a pair of vertically spaced superimposed vehicle-supporting levels of a railway freight car, a rectangular carriage-supporting frame adapted to be positioned in close proximity to the loading end of the railway car with its lower end region resting upon a fixed supporting surface and with its upper end region extending above the elevation of the upper level, said frame including spaced vertical side frame members and a top horizontal frame member, a carriage mounted on said frame for vertical shifting movement in opposite directions, an elongated ramp structure having its forward end freely pivoted to said carriage and having its rear end adapted for tractional sliding support on said supporting surface, said carriage being movable between a lower position wherein the forward end of the ramp structure is in operative horizontal registry with the loading end of the lower vehicle-supporting level and an upper position wherein said forward end is in registry with the loading end of the upper vehicle-supporting level, a bridge plate pivotally connected to the forward end of said ramp structure and movable between an elevated vertical position wherein it lies substantially within the confines of said frame and an extended horizontal lowered position wherein the distal end region thereof may rest upon a selected vehicle supporting level, a cable secured to the distal end of said bridge plate assembly, a cable-receiving winch mounted on said carriage and movable bodily therewith, and operatively connected to the cable, cable and pulley means for moving said carriage in either direction between said lower and upper positions and including a hoisting winch, a normally deenergized reversible electric motor operatively connected to the hoisting winch in driving relationship, a normally energized spring-loaded solenoid-actuated brake for said motor shaft operable when deenergized to apply braking torque to the motor shaft and operable when energized to release said motor shaft, said vertical side frame members being formed with respective series of vertically spaced latch abutments therealong, latch fingers on said carriage normally in latching engagement with said series of latching abutments respectively, normally deenergized solenoids operatively connected to said latch fingers and operable upon energization thereof to move said latch fingers out of latching engagement with said latching abutments, a foot structure pivotally connected to the lower end of said frame and adapted to rest upon said fixed supporting surface for supporting the frame from the latter, and means for adjustably varying the inclination of said frame relative to the foot structure.

References Cited in the file of this patent

UNITED STATES PATENTS

| | | |
|---|---|---|
| 903,157 | Allen | Nov. 10, 1908 |
| 1,106,074 | Bidlake | Aug. 4, 1914 |
| 1,569,469 | Elzey | Jan. 12, 1926 |
| 2,517,348 | Rachels | Aug. 1, 1950 |
| 2,607,937 | Stone | Aug. 26, 1952 |
| 2,614,755 | Binaut | Oct. 21, 1952 |

FOREIGN PATENTS

| | | |
|---|---|---|
| 699,321 | Great Britain | Sept 29, 1950 |